United States Patent
Horstman (10) Patent No.: US 9,981,461 B1
(45) Date of Patent: May 29, 2018

(54) STORAGE VESSEL FOR COMPRESSED FLUIDS

(71) Applicant: CNG Storage Solutions, LLC, Morgan, UT (US)

(72) Inventor: Hugh L. Horstman, Morgan, UT (US)

(73) Assignee: CNG Storage Solutions, LLC, Morgan, UT (US)

(*) Notice: Subject to any disclaimer, the term of this patent is extended or adjusted under 35 U.S.C. 154(b) by 683 days.

(21) Appl. No.: 14/469,831

(22) Filed: Aug. 27, 2014

Related U.S. Application Data (62) Division of application No. 13/791,065, filed on Mar. 8, 2013, now Pat. No. 8,844,760.

(60) Provisional application No. 61/680,920, filed on Aug. 8, 2012.

(51) Int. Cl.
| | |
|---|---|
| B32B 38/18 | (2006.01) |
| B32B 37/14 | (2006.01) |
| B29C 70/30 | (2006.01) |
| F17C 1/08 | (2006.01) |
| B32B 37/00 | (2006.01) |
| B32B 37/02 | (2006.01) |
| B32B 38/00 | (2006.01) |
| B32B 38/08 | (2006.01) |

(52) U.S. Cl.
CPC .......... *B32B 38/1816* (2013.01); *B29C 70/30* (2013.01); *B32B 37/0038* (2013.01); *B32B 37/02* (2013.01); *B32B 37/142* (2013.01); *B32B 38/0036* (2013.01); *B32B 38/08* (2013.01); *F17C 1/08* (2013.01); *B32B 2038/0076* (2013.01); *B32B 2305/18* (2013.01); *B32B 2305/72* (2013.01); *B32B 2307/7242* (2013.01); *B32B 2311/18* (2013.01); *B32B 2311/30* (2013.01); *B32B 2313/04* (2013.01); *B32B 2331/00* (2013.01); *B32B 2363/00* (2013.01); *B32B 2367/00* (2013.01); *B32B 2371/00* (2013.01); *B32B 2379/08* (2013.01); *B32B 2439/40* (2013.01); *F17C 2203/012* (2013.01); *F17C 2203/066* (2013.01); *F17C 2209/232* (2013.01)

(58) Field of Classification Search
USPC ....................................................... 264/257
See application file for complete search history.

(56) References Cited

U.S. PATENT DOCUMENTS

| | | | |
|---|---|---|---|
| 5,323,953 | A | 6/1994 | Adderley et al. |
| 5,443,578 | A | 8/1995 | Davis, Jr. |

(Continued)

FOREIGN PATENT DOCUMENTS

EP 0633422 A1 1/1995

*Primary Examiner* — Jacob T Minskey
*Assistant Examiner* — Baileigh Kate Darnell
(74) *Attorney, Agent, or Firm* — Andriy Lytvyn; Smith & Hopen, P.A.

(57) ABSTRACT

A vessel for storing pressurized gas. The storage vessel may be manufactured in a variety of predetermined shapes. Plural frame members are interconnected with each other, collectively forming a lattice frame. A network of internal supports is disposed within the interior of the lattice frame, the internal supports being made of a carbon-reinforced composite material. The storage vessel has an outer shell made up of layers of carbon-reinforced composite material sheets enveloping the exterior of the lattice frame.

17 Claims, 6 Drawing Sheets

(56) References Cited

U.S. PATENT DOCUMENTS

| | | | | |
|---|---|---|---|---|
| 5,462,193 A | * | 10/1995 | Schoo | F17C 1/02 |
| | | | | 220/652 |
| 5,647,503 A | * | 7/1997 | Steele | B29C 70/24 |
| | | | | 220/589 |
| 6,257,210 B1 | | 7/2001 | Kim | |
| 6,613,258 B1 | * | 9/2003 | Maison | B29C 65/7882 |
| | | | | 156/189 |
| 7,232,156 B2 | | 6/2007 | Rife et al. | |
| 8,322,551 B2 | | 12/2012 | Ramoo et al. | |
| 2001/0031350 A1 | * | 10/2001 | Day | B29C 70/086 |
| | | | | 428/317.9 |
| 2010/0230422 A1 | * | 9/2010 | Illesi | F17C 1/06 |
| | | | | 220/586 |
| 2012/0012593 A1 | * | 1/2012 | Kuroiwa | B29C 70/32 |
| | | | | 220/660 |
| 2013/0276308 A1 | * | 10/2013 | Kang | B21F 27/12 |
| | | | | 29/897 |
| 2014/0034653 A1 | * | 2/2014 | Chang | F17C 3/025 |
| | | | | 220/581 |

\* cited by examiner

STORAGE VESSEL FOR COMPRESSED FLUIDS

CROSS-REFERENCE TO RELATED APPLICATIONS

This application is a divisional application of a pending U.S. Non-Provisional patent application Ser. No. 13/791,065 entitled, "Storage Vessel for Compressed Fluids" filed on Mar. 8, 2013, which further claims priority to U.S. provisional application No. 61/680,920 entitled "Storage Vessel for Compressed Liquids or Gasses," filed on Aug. 8, 2012.

BACKGROUND OF THE INVENTION

1. Field of the Invention

This invention relates to storage vessels for compressed fluids. More specifically, it relates to light-weight storage vessels conformable to a desired geometry.

2. Brief Description of the Related Art

As the prices of gasoline continue to rise and the damaging effects of exhaust fumes exerted into the atmosphere by gasoline combustion engines come to the forefront of public attention, natural gas vehicles rapidly gain popularity. According to some estimates, currently, more than 15 million vehicles worldwide are fueled by compressed natural gas (CNG), and their number is growing. CNG has a much lower emission profile than any other fossil fuel, while providing comparable mileage per gasoline gallon equivalent (GGE), making it an attractive environmentally-friendly alternative to gasoline and diesel. Natural gas is fairly abundant in many parts of the world, including the United States, and commonly costs only a fraction of the price of gasoline, making CNG an astute choice from an economic perspective.

Natural gas vehicles face a number of issues that must be resolved to facilitate a widespread adoption of this technology. One major problem arises with respect to storage of CNG in a vehicle. Gas is typically stored in spherical or cylindrical vessels because of their inherent abilities to resist internal pressures. Conventional CNG tanks are made of steel, making them very heavy and unwieldy. For automobiles, cylindrical CNG tanks are generally placed in the trunk, where they occupy considerable volume and add excess weight. Accordingly, what is needed is a light-weight storage vessel capable of withstanding high internal pressures and conformable to desired geometries better suitable for unobtrusive placement in vehicles.

This problem was recognized by others, but was addressed through inferior approaches. For example, patent no. EP0633422 discloses a CNG storage vessel that may be formed to different shapes. The storage vessel relies on a number of internal I-beams that are welded or diffusion bonded to the interior walls of a vessel, which is made of superplastic material. Such design creates a number of problems. The I-beams add additional weight, while welding may weaken the structure and create failure points, therefore, compromising the safety of the tank when it is filled with a highly pressurized gas. Accordingly, the solution offered by EP0633422 has several serious flaws, all of which are eliminated in the present invention.

A similar solution to the one provided by EP0633422 was offered by U.S. Pat. No. 5,323,953 assigned to the automotive giant Rolls-Royce. This prior art reference teaches a multi-layer sheet metal sandwich structure with a predetermined pattern of solid state diffusion bonds between all neighboring layers. The diffusion bonds reinforce the vessel, thus making it suitable for containing highly pressurized gas. This design employs heavy sheet metal and diffusion bonds, which increase the weight of the vessel.

The present invention utilizes a much different design that eliminates the aforementioned drawbacks present in the prior art. In view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need for a light-weight storage vessel for CNG capable of withstanding high internal pressures and conformable to desired geometries is now met by a new, useful, and nonobvious invention.

In an embodiment, the novel structure includes a network of internal supports disposed within the interior of the storage vessel. The internal supports may be integrated into the structure by utilizing a lattice frame composed of a plurality of interconnected frame members. Each internal support is a strip of fiber-reinforced composite material disposed between two or more frame members. When the storage vessel is filled with pressurized gas, the walls of the storage vessel are subjected to large outwardly directed forces due to high internal pressure. The internal supports counteract the pressure forces by applying inwardly directed tension.

The storage vessel includes a fluid-impermeable outer shell that possesses required structural integrity and ability to withstand high internal pressures without undergoing plastic deformation. The outer shell is composed of several differently-oriented layers of fiber-reinforced composite material. The lattice frame may be utilized for integrating the outer shell into the structure of the storage vessel. This may be accomplished by covering all exterior surfaces of the lattice frame with one or more layers of fiber-reinforced composite material.

A valve module is connected to the storage vessel to permit charging and discharging the vessel with compressed gas.

In an embodiment, the internal supports may be twisted within the interior of the lattice frame to reduce their surface area. This technique allows more interior supports to pass through the interior of the storage vessel without interfering with one another. In an alternative embodiment, the internal supports may be tapered rather than twisted to achieve the same goal. In yet another embodiment, one or more internal supports may be tied or gathered to reduce their surface.

In an embodiment, the frame members may be made of a fiber-reinforced composite material, steel, titanium, alloys thereof, and other ductile materials exhibiting high yield strength, shear modules, fracture toughness, hardness, and specific strength. The frame members may be interconnected by means of welding or diffusion bonding collectively forming the lattice frame of a predetermined shape suitable for a particular application.

In an alternative embodiment, the lattice frame is only needed during the manufacturing process, and once the curing process has been completed, the lattice frame does not serve a notable function. In such embodiment, the lattice frame may be made of a polyurethane foam, which may be dissolved after curing is completed by introducing organic solvent to the interior of the storage vessel. In alternative, the lattice frame may be left in place if removal is not necessary to achieve desired strength and functionality.

The fiber-reinforced composite material comprises a reinforcing base fabric infiltrated with a matrix resin. Reinforcing base fabric may be one of the following: carbon fiber, carbon nanotubes, para-aramid synthetic fiber, aramid fiber, vinylon fiber, and polyester fiber fabric. The matrix resin is selected from the group consisting of epoxy resin, vinyl ester resin, polyester resin, phenolic resin, polybutylene terephthalate resin, polyimide resin, polyetheretherketone resin, and bis-maleimide resin.

In an embodiment, additional materials may be placed between the layers of the outer shell to increase strength, fluid impermeability, shock absorption, thermal insulation, etc.

The fiber-reinforced composite material must be cured under proper temperature and pressure conditions. An autoclave may be utilized to achieve high temperature and pressure curing. In one embodiment, the curing process is performed only once after all internal supports and outer shell layers have been added to the lattice frame. In an alternative embodiment, the curing processes may be done in stages to allow each set of components to cure before the next set is introduced.

DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
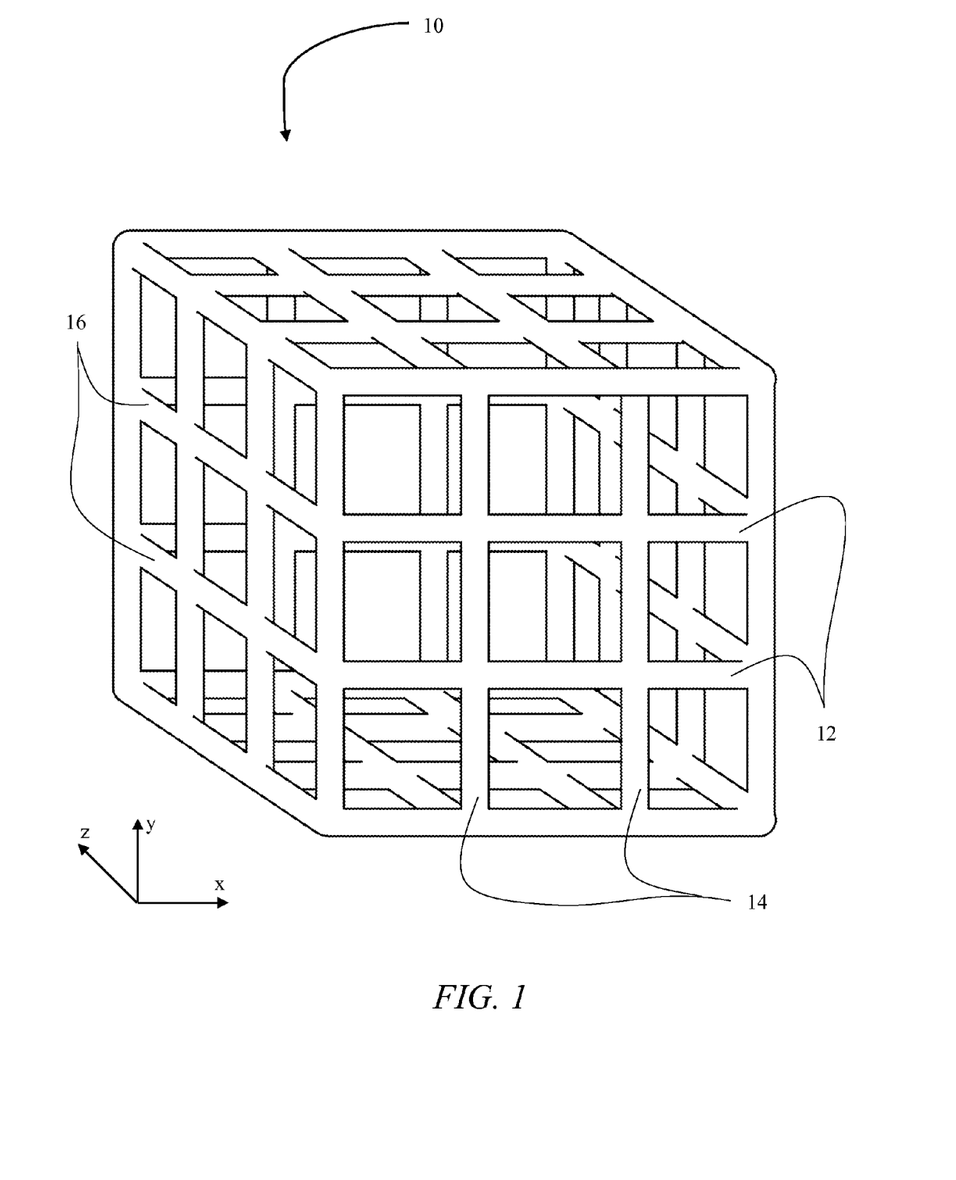
FIG. 1 is a perspective view of the lattice frame.

Referring to FIG. 1, during the manufacturing process, the storage vessel at its core initially comprises a lattice frame 10. Lattice frame 10 may have various geometries depending on the intended application and specified dimensions. This adaptability constitutes a major advancement over the prior art by allowing CNG storage vessels to have a shape conformable to a desired application. For example, CNG vessels are commonly utilized in natural gas vehicles (NGVs). Currently, most NGVs are equipped with cylindrical or spherical CNG tanks, which are usually placed in the trunk of a vehicle, thus occupying valuable space. Lattice frame 10, however, may be made in a shape resembling a common gasoline tank, therefore, making retrofitting gasoline and diesel automobiles into NGVs or designing new NGVs a much more attractive and feasible option.

For illustration purposes, FIG. 1 depicts lattice frame 10 in a shape of a cube. As explained above, this shape is merely exemplary and countless other shapes are possible. As depicted, lattice frame 10 includes longitudinal frame members 12 in the direction of the x-axis, vertical frame members 14 in the direction of the y-axis, and latitudinal frame members 16 in the direction of the z-axis. It should be noted, that the three sets of members for lattice shapes other than a parallelepiped will be oriented differently and will not necessarily be aligned with the x, y, and z axes.

Frame members 12, 14, and 16 may be cylindrical and may be either solid or tubular. In an embodiment, lattice frame 10 may provide additional structural support to the storage vessel. In such embodiment, frame members 12, 14, and 16 are preferably of a material having a high yield strength to reduce the possibility of plastic deformation occurring, therefore, preventing undesired permanent alterations to the shape of lattice frame 10. Frame members 12, 14, and 16 may be interconnected by a number of means known in the art, including welding and diffusion bonding. Due to high internal pressures to which the storage vessel is to be subjected, fatigue failure may be an important consideration. Accordingly, it is preferable that stress concentration points are reduced as much as feasible. Welding may increase susceptibility of lattice frame 10 to fatigue stress, and therefore, it is preferable that techniques that increase the fatigue strength are employed, for example, high frequency impact treatment. Fiber-reinforced composite materials, titanium, steel, and various alloys thereof are examples of some possible materials from which frame members 12, 14, and 16 may be manufactured, however, other materials may also be used without departing from the scope of the invention.

In an alternative embodiment, the sole function of lattice frame 10 is to enable integration of internal supports 20, 22, and 24 and exterior layers 26, 28, and 30 into the storage vessel during the manufacturing stages. In this embodiment, frame members 12, 14, and 16 may be made of a material dissolvable in a solvent. One category of acceptable materials is thermosetting polymers containing organic unit chains, such as polyurethane. Lattice frame 10 may be made of polyurethane foam, and due to the polyurethane foam being thermosetting, lattice frame 10 does not melt during the process of curing internal supports 20, 22, and 24 and exterior layers 26, 28, and 30 at high temperatures. After the fiber-reinforced composite materials are cured, lattice 10 frame is no longer needed. Accordingly, an organic solvent may be introduced into the interior of the storage vessel to dissolve lattice frame 10. Using polyurethane foam instead of titanium or steel significantly reduces the cost of material and manufacturing of the lattice frame and lowers the weight of the storage vessel.

Figure 2A:
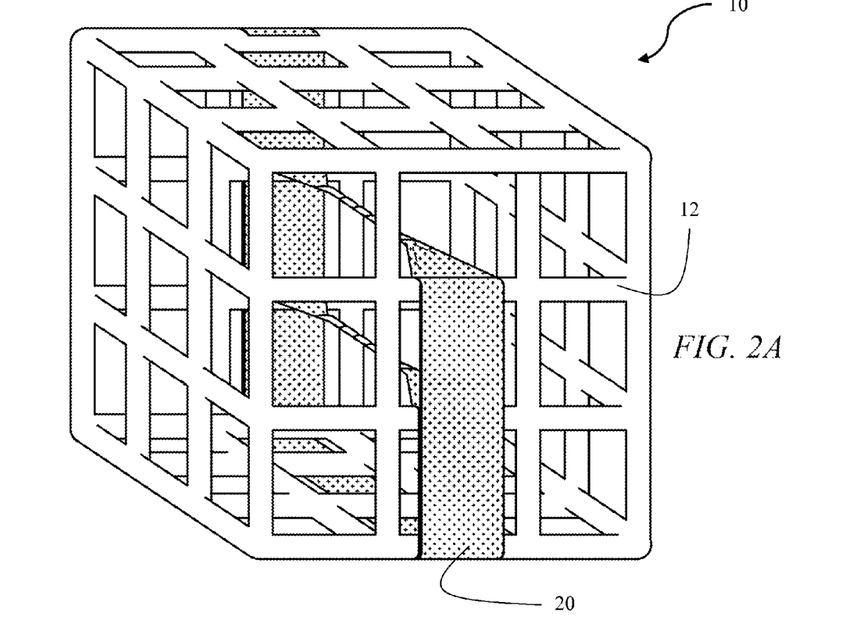
FIGS. 2A-C depict a sequence of internal supports being integrated into the lattice frame.
Figure 2B:
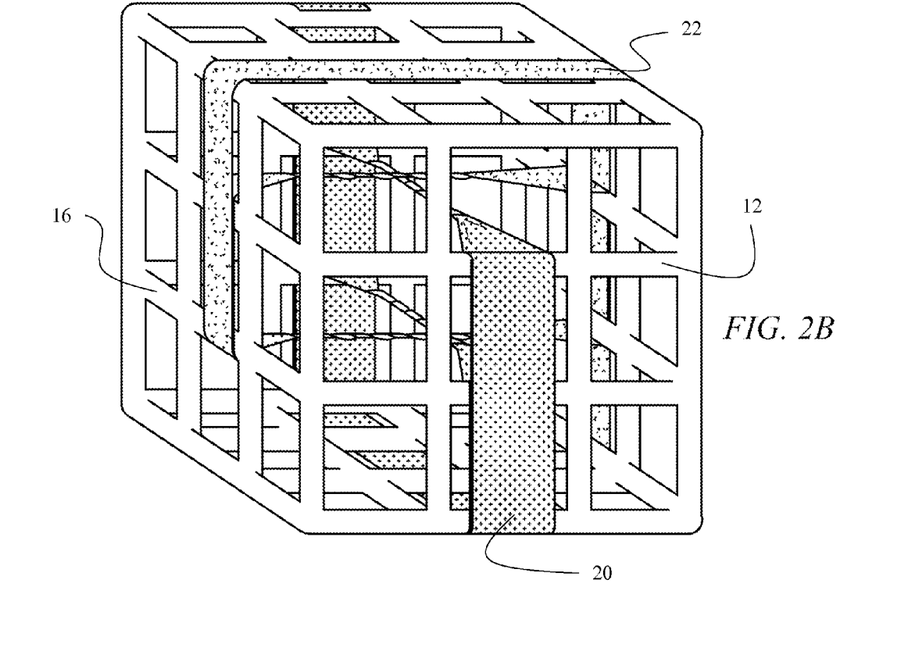
Figure 2C:
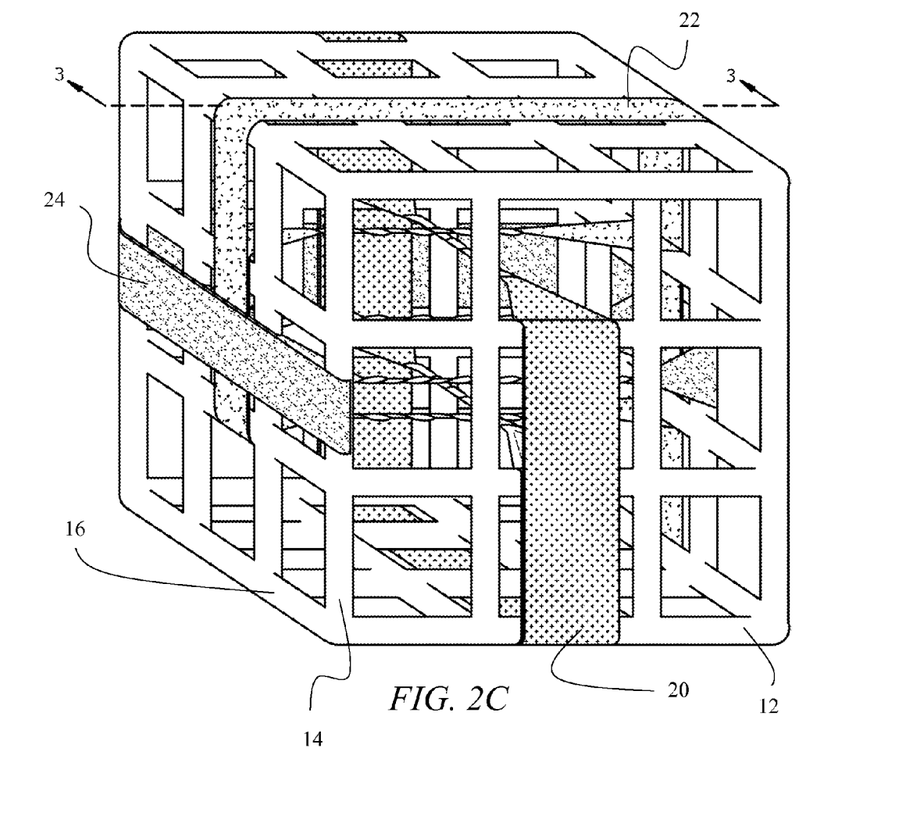
Figure 3:
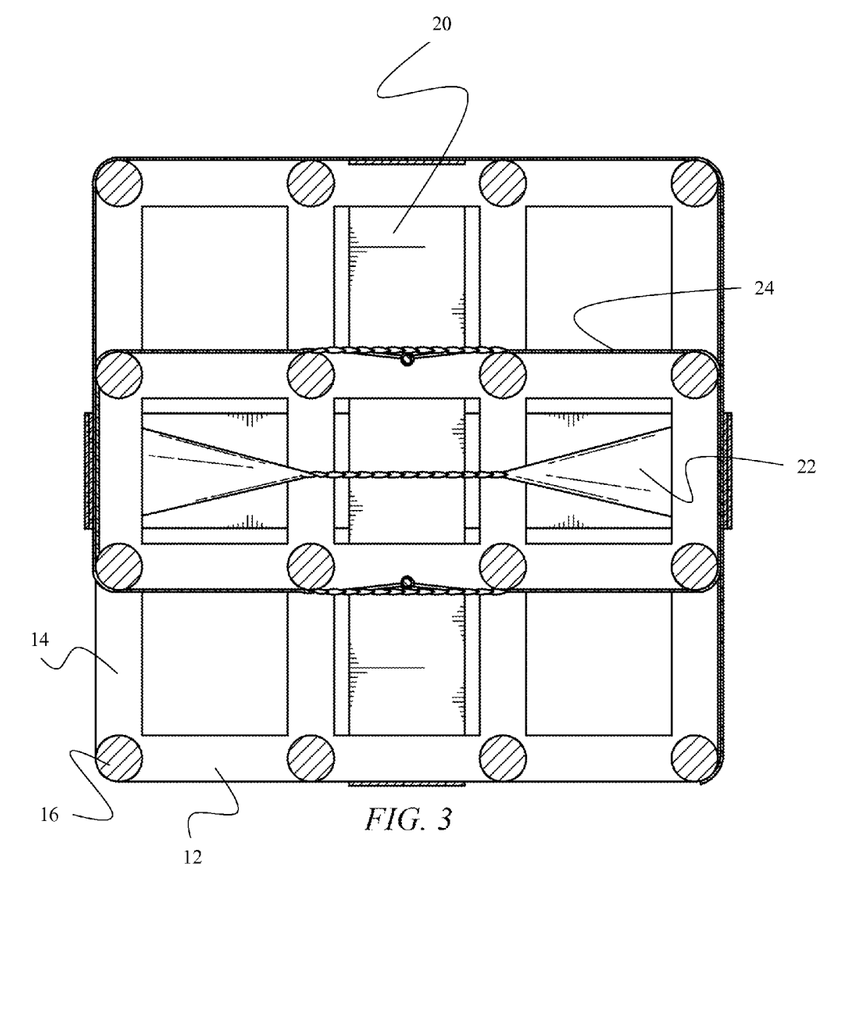
FIG. 3 is a cross-sectional view of the lattice frame depicting a network of internal supports within the lattice frame.

Referring to FIGS. 2A-C, integration of internal supports 20, 22, and 24 into lattice frame 10 is illustrated. Internal supports 20, 22, and 24 are strips of fiber-reinforced composite material taut between opposite frame members. A wide array of fiber-reinforced composite materials may be used for internal supports 20, 22, and 24. The preferable materials are those exhibiting high shear modules, fracture toughness, hardness, and low weight. The fiber-reinforced composite materials comprise a reinforcing base fabric infiltrated with a matrix resin. The carbon-fiber-reinforced polymers are preferred. Other acceptable reinforcing base fabrics include the following: carbon nanotubes, para-aramid synthetic fiber, aramid fiber, vinylon fiber, and polyester fiber fabrics. The matrix resin is preferably epoxy resin, but other polymers including vinyl ester resin, polyester resin, phenolic resin, polybutylene terephthalate resin, polyimide resin, polyetheretherketone resin, and bis-maleimide resin.

The following is one possible technique that could be used to form internal supports 20, 22, and 24. The example is directed to parallelepiped lattice frame 10. Internal supports are formed in three directions: longitudinal, latitudinal, and vertical. To create latitudinal internal support 20, a strip of reinforcing base fabric is infiltrated with a matrix resin. The infiltrated strip is wound tightly around a longitudinal frame member 12 and stretched through the interior of lattice frame 10. The strip is then wound around frame members 12 on the opposite side of lattice frame 10. A plurality of infiltrated strips of fiber woven fabric are stretched and wound in the similar manner between various opposite longitudinal frame members 12, thus forming a plurality of latitudinal internal supports 20, which provide tension that opposes internal forces exerted on the walls of the storage vessel in the z-axis direction when the vessel is filled with highly pressurized gas. The number of internal supports 20 varies depending on geometry of lattice frame 10. Preferably, there is at least one latitudinal internal support 20 between each set of opposite longitudinal frame members 12. In an alternative embodiment, frame members 12, 14, and 16 may contain slits into which infiltrated strips are inserted and secured—this is an alternative technique to winding the strips around the circumference of frame members 12, 14, and 16.

As depicted in FIGS. 2A-C, internal supports along all directional axes may be established by stretching infiltrated strips of fiber woven fabric between frame members 12, 14, and 16 on opposite faces of lattice frame 10: for latitudinal internal support, the strips connect frame members on front and back faces of lattice frame 10; for longitudinal internal support, the strips connect the left and right faces of lattice frame 10; and for vertical support, the strips connect top and bottom faces.

Moreover, the fiber woven fabric strips may be disposed between any two or more frame members 12, 14, and 16 on opposite or adjacent faces of lattice frame 10 to provide internal support in a desired direction. For lattice frame geometries other than parallelepipeds, internal supports 20, 22, and 24 will have orientations that differ from latitudinal-vertical-longitudinal configuration explained in the present example. Additional strips of fiber woven fabric may be utilized to create additional internal supports. For some geometries of the storage vessels, it may be advantageous to have one more strips make multiple passes through the interior of lattice frame 10.

The strips of reinforcing base fabric may have different thickness, width, length, density, and weave pattern depending on the specific design factors, such as geometry of the storage vessel, internal pressure to which the vessel will be subjected, cost of materials, etc. Preferably, the width of each strip should not exceed the width of the frame member around which it is being wound. In the embodiment depicted in FIGS. 2A-C and 3, the strips are twisted within the interior of lattice frame 10. This technique allows for a large number of strips to pass within the interior of lattice frame 10 without interfering with each other. In an alternative embodiment, the strips may have tapered sections rather than twists to accomplish this purpose. In yet another embodiment, the strips may be of uniform width that is less than the width of frame members 12, 14, and 16, thus allowing several strips to be wound within the same lattice cell. Furthermore, some strips may be gathered or tied within the interior of the lattice structure to reduce the surface area of those strips creating sufficient space for other internal supports. This would also ensure that sufficient space exists between the strips so that gas molecules can freely disburse within the storage vessel.

After the infiltrated strips of fiber woven fabric have been integrated into lattice frame 10 forming a network of multi-directional internal supports 20, 22, and 24, lattice frame 10 is cured at high temperature and/or pressure. A specialized oven may be utilized, but preferably, an autoclave is used to achieve the highest material strength. When the fiber-reinforced composite material strips are cured, they harden providing adequate amount of internal support to lattice frame 10.

Figure 4A:
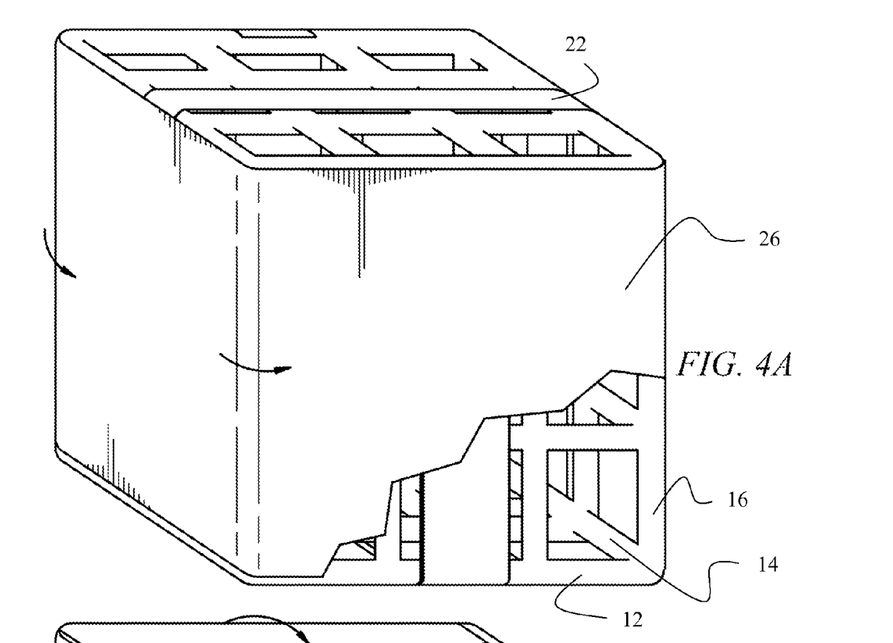
FIGS. 4A-C depict a sequence of exterior shell enveloping the lattice frame being formed layer by layer.
Figure 4B:
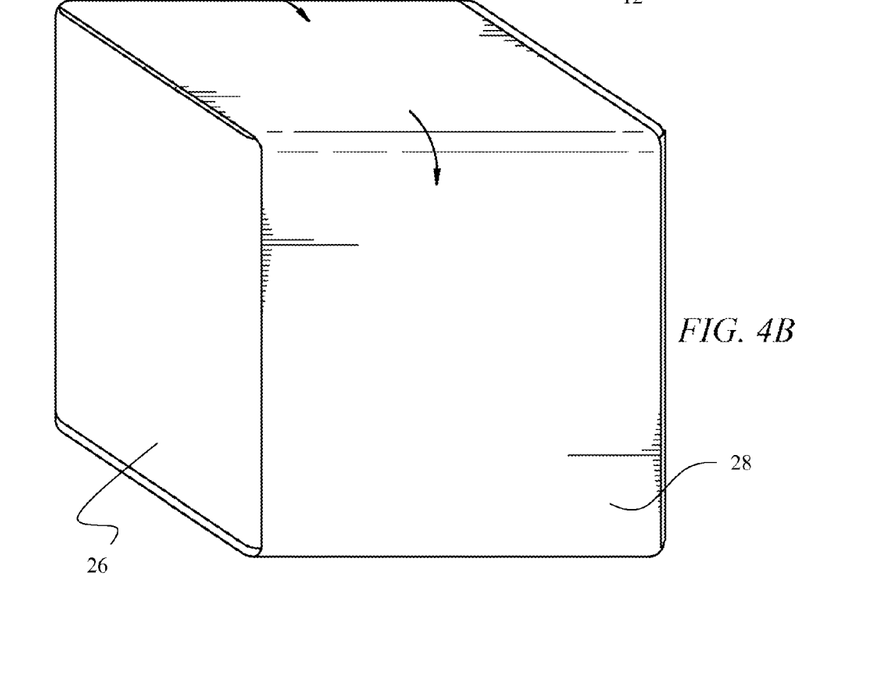
Figure 4C:
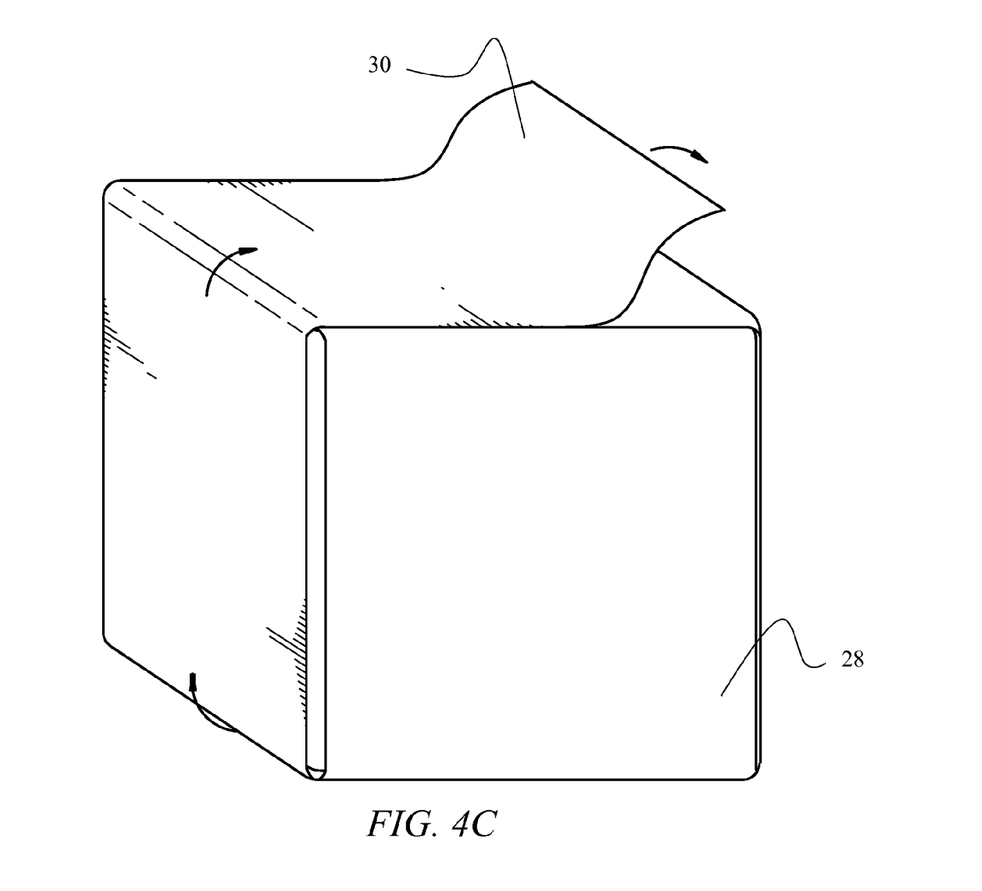

FIGS. 4A-C depict formation of an exterior shell comprising three exterior layers 26, 28, and 30. FIG. 4A depicts lattice frame 10 having an integrated network of cured strips of fiber-reinforced composite material forming interior supports 20, 22, and 24 being enveloped with an exterior layer 26 of infiltrated sheets of fiber woven fabric. In preferred embodiment, all four lateral faces of lattice frame 10 are at least once enclosed by exterior layer 26. If further reinforcement is necessary, the sheets of fiber woven fabric may be wrapped around the lateral surface several times providing additional exterior support layers.

FIGS. 4B and 4C depict lattice frame 10 being enveloped with exterior layers 28 and 30. Exterior layers 28 and 30 enclose top and bottom faces of lattice frame 10. For parallelepiped lattice frame 10, the preferred embodiment involves enveloping lattice frame 10 around all three axes to provide support to each face of lattice frame 10 in x, y, and z directions. According to this configuration, each face of lattice frame 10 is enclosed by at least two differently oriented exterior layers. The exterior shell is impermeable to fluids. To achieve desired strength, sealing, insulation, shock absorption, etc., layers of other materials may be sandwiched between the layers of the fiber-reinforced composite material forming the layers of the exterior shell.

After the infiltrated sheets of fiber woven fabric forming exterior layers 26, 28, and 30 have been wrapped around lattice frame 10, they are cured at high temperature and pressure. Preferably, an autoclave is utilized for this purpose, although a high-temperature oven may also be used. In an alternative embodiment, the curing process is performed after application of each exterior layer. Curing each exterior layer individually allows each layer to harden and take its final shape prior to the application of subsequent layers, thus ensuring that each level is wrapped around lattice frame 10 as tightly as possible to increase the overall strength of the vessel. Furthermore, layers of other materials may be placed in-between individual exterior layers between curing stages.

In alternative embodiments the storage vessel is only cured once and only after all internal supports 12, 14, and 16 and exterior layers 26, 28, and 30 have been integrated into lattice frame 10. This technique simplifies the manufacturing process and substantially reduces the overall curing time.

To allow for charging and discharging of the storage vessel, a valve module may be integrated into the vessel. In the embodiment where lattice frame 10 is only used during the manufacturing process and does not form an integral part of the storage vessel, the valve module may be integrated directly into the outer shell. In the embodiment where lattice frame 10 forms a part of the finished storage vessel, the valve module may be integrated into one of frame members 12, 14, or 16 of lattice frame 10.

A hole may be drilled or otherwise made to provide access to the interior of the vessel. A tubular pipe made of a fiber-reinforced composite material, steel, titanium, an alloy thereof, or another high-strength material may securely and sealingly jointed into the hole. The valve module—generally containing a control valve, an isolation valve, and a pressure relief valve—is attached to the exterior end of the pipe. The valve module is used to fill the vessel with CNG from a detachable supply source. The valve module may also be used for discharging the gas from the vessel. In NGV applications, the valve module may be utilized to supply CNG from the vessel to the combustion chamber of an engine. In an alternative embodiment, two separate valve modules may be used: one for filling the vessel with CNG and another one for discharging it.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

GLOSSARY OF TERMS

Compressed gas—a highly pressurized gas, typical pressures are 2900-3600 psi.

Curing—hardening of a polymer material by cross-linking of polymer chains, brought about by chemical additives, ultraviolet radiation, electron beam, heat, or a combination thereof.

Fiber-reinforced composite material—a material comprising a fiber reinforcing base fabric infiltrated with a matrix resin.

Fiber reinforcing base fabric—a fiber woven material that is infiltrated with a matrix resin to from a fiber-reinforced composite material.

Frame members—individual sections of the lattice frame

Lattice frame—a three-dimensional carcass composed of interconnected frame members adapted to support the internal supports and the outer shell.

Matrix resin—a polymer with which fiber reinforcing base is infiltrated to form a fiber-reinforced composite material.

Internal supports—members disposed within the storage vessel that provide tension forces to counter the pressure forces applied by the compressed gas contained within the storage vessel Exterior shell—enclosure tightly enveloping the lattice frame and separating the interior of the storage vessel from the exterior.

Strip—a piece of fiber reinforcing base fabric having a predetermined geometric shape.

Tapered—the width of an interior section being narrower than the width of the end sections.

Twisting—turning a strip about its longitudinal axis.

Valve module—a module integrated into the storage vessel in fluid communication with the interior of the vessel, valve module permits controlled charging and discharging of the vessel with compressed gas.

Wrapping—covering an object with a flexible material.

What is claimed is:

1. A method of making a gas storage vessel, comprising the steps of:
   providing a lattice frame defining a hollow carcass of the gas storage vessel, the lattice frame having a plurality of interconnected elongated lattice frame members, wherein adjacent lattice frame members define openings therebetween;
   infiltrating a first plurality and a second plurality of fiber reinforcing base fabric strips with a matrix resin, wherein a width of each of the first plurality of infiltrated strips is substantially greater than its thickness;
   affixing an end of a first infiltrated strip to one of the lattice frame members and extending the first infiltrated strip between at least two non-adjacent lattice frame members thereby disposing the first plurality of infiltrated strips within the lattice frame, the first plurality of infiltrated strips forming internal supports traversing an interior of the lattice frame, wherein at least two internal supports are in a non-parallel alignment with one another;
   wrapping the second plurality of infiltrated strips around exterior of the lattice frame to create an exterior shell impermeable to fluids; and
   curing the first and the second pluralities of infiltrated strips at a predetermined temperature and pressure.

2. The method according to claim 1, further comprising disposing one or more additional layers of a predetermined material in sandwiched relationship between layers of the second plurality of infiltrated strips.

3. The method according to claim 1, further comprising integrating a valve module into the exterior shell, the valve module configured for charging and discharging the gas storage vessel.

4. The method according to claim 1, wherein at least some of the second plurality of infiltrated strips have different orientations with one another.

5. The method according to claim 1, wherein an autoclave is used to cure the fiber-reinforced composite material.

6. The method according to claim 1, wherein at least some of the first plurality of infiltrated strips are twisted or tapered.

7. The method according to claim 1, wherein the lattice frame is made of steel, titanium, an alloy thereof, or fiber-reinforced composite material.

8. The method according to claim 1, wherein the reinforcing base fabric is selected from the group consisting of carbon fiber, carbon nanotubes, para-aramid synthetic fiber, aramid fiber, vinylon fiber, and polyester fiber fabrics.

9. The method according to claim 1, wherein the matrix resin is selected from the group consisting of epoxy resin, vinyl ester resin, polyester resin, phenolic resin, polybutylene terephthalate resin, polyimide resin, polyetheretherketone resin, and bis-maleimide resin.

10. A method of making a gas storage vessel, comprising the steps of:
    providing a lattice frame having a plurality of interconnected elongated lattice frame members, wherein adjacent lattice frame members define openings therebetween, the lattice frame being hollow and partially enclosing an interior space;
    infiltrating a first plurality and a second plurality of fiber reinforcing base fabric strips with a matrix resin to form a fiber-reinforced composite material, wherein a width of each of the first plurality of infiltrated strips is substantially greater than its thickness;
    disposing the first plurality of infiltrated strips within the lattice frame by affixing an end of a first infiltrated strip to one of the lattice frame members and extending the first infiltrated strip between at least two non-adjacent lattice frame members so that the first plurality of infiltrated strips traverses the interior space of the lattice frame, each of the first plurality of infiltrated strips being supported by at least two frame members, wherein at least two of the first plurality of infiltrated strips are in a non-parallel alignment with one another;

wrapping the second plurality of infiltrated strips around exterior of the lattice frame to create an exterior shell impermeable to fluids; and curing the first and the second pluralities of infiltrated strips at a predetermined temperature and pressure.

11. The method according to claim 10, further comprising disposing one or more additional layers of a predetermined material in sandwiched relationship between layers of the second plurality of infiltrated strips.

12. The method according to claim 10, further comprising integrating a valve module into the outer shell, the valve configured for charging and discharging the gas storage vessel.

13. The method according to claim 10, wherein an autoclave is used to cure the fiber-reinforced composite material.

14. The method according to claim 10, wherein at least some of the first plurality of infiltrated strips are twisted or tapered.

15. The method according to claim 10, wherein the lattice frame is made of steel, titanium, an alloy thereof, or fiber-reinforced composite material.

16. The method according to claim 10, wherein the reinforcing base fabric is selected from the group consisting of carbon fiber, carbon nanotubes, para-aramid synthetic fiber, aramid fiber, vinylon fiber, and polyester fiber fabrics.

17. The method according to claim 10, wherein the matrix resin is selected from the group consisting of epoxy resin, vinyl ester resin, polyester resin, phenolic resin, polybutylene terephthalate resin, polyimide resin, polyetheretherketone resin, and bis-maleimide resin.

* * * * *